Nov. 3, 1964    R. GOTTSCHALD    3,155,406
BALL AND SOCKET JOINTS
Filed Oct. 3, 1960
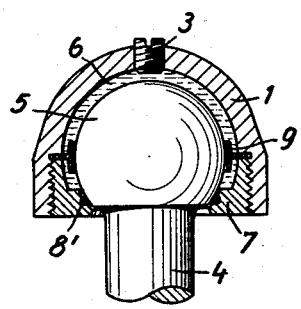

3,155,406
BALL AND SOCKET JOINTS
Rudolf Gottschald, Osterrath, Germany, assignor to Viktor Langen, Dusseldorf, Germany
Filed Oct. 3, 1960, Ser. No. 59,968
Claims priority, application Germany, Oct. 3, 1959, E 18,326
7 Claims. (Cl. 287—87)

This invention relates to a ball and socket joint which consists of a joint pin with a ball portion and of a joint housing, in which the ball is mounted, and is designed in particular for use as a supporting joint for wheel suspensions of motor vehicles.

The object of the invention is, in particular, to provide a ball and socket joint of this nature which does not require servicing, i.e. does not require any subsequent lubrication, and in which the demands made of the precision of the machining of the parts forming the ball and socket joint are reduced without reducing the smoothness of operation of the joint, and is adapted to take up even very large loads.

As is known, it is very difficult to produce a geometrically satisfactory spherical shape. This is the case most especially with hollow spherical surfaces, such as are found, for example, as bearing surfaces in the housings of ball and socket joints. This is one of the reasons why bearing shells made of a rubber elastic (highly elastic) plastic, for example cross-linked polyurethanes, are already frequently used in ball and socket joints for the ball portion of the joint pin. Such bearing shells mean a substantial improvement as compared with rigid bearing shells and, moreover, afford the advantage of not requiring any lubrication. It has not been possible to introduce ball and socket joints equipped with such bearing shells for all applications, and in particular not for use as wheel joints for suspending the wheels of motor vehicles.

According to the invention, the space in the housing between the side thereof, which is closed at the end remote from the joint pin, and the ball portion, that is between the inside wall of the housing and the ball portion, is filled with a flowable or plastic supporting layer up to a closure or seal for the intermediate space provided at the ball end portion and which is prevented from escaping from, or flowing out of, the housing. In the ball and socket joint formed in this way, the ball portion floats so to speak in the housing on the flowable layer, which rests closely against the ball portion and, owing to its ability to flow, does not impair the smooth operation of the ball and socket joint. Owing to the complete filling of the intermediate space by the supporting layer and the consequently play-free enclosure of the ball portion, the ball and socket joint is also suitable for taking up loads which are so large that the flowable material could not be used for taking them up, owing to its ability to flow, if there were a possibility of escape. This flowable material also does not cause any wear.

The supporting layer may be formed, for example, by a liquid, for instance oil.

To seal the space filled with the flowable or plastic supporting layer, it may be advantageous to provide between the ball portion and the inner wall of the housing a sealing element resting against the ball portion.

This sealing element may be provided on that side of the ball portion which is remote from the joint pin and consists of an annular disc fitting tightly against the inner wall of the housing, said annular disc resting on the ball portion laterally of its equator line by means of its inner edge extending towards said ball portion, after the fashion of a lip. In this case, the outer edge of the annular disc is fixed inside the housing, the inner edge of the annular disc acting as a sealing lip is pressed against the ball by the flowable supporting layer with greater or lesser force according to the load on the joint, so that the seal acts in dependence upon the load on the joint.

The sealing element may also be formed by a ring, for example a cord ring, which engages with a part of its cross-section in a groove in the inside of the housing and rests against the ball portion by that part of its cross-section which projects from the groove. This seal may also be provided in addition to the seal formed by means of the annular disc.

In an advantageous embodiment of the invention, a bearing ring surrounding the ball portion on both sides of the ball equator may be provided on the joint housing for taking up forces directly transversely of the axis of the joint pin. The transverse forces are absorbed by the bearing ring, so that, in combination with the supporting layer, the housing is not subjected to any direct bearing stresses.

The bearing ring can also be used for securing the annular sealing disc in the housing in that the bearing ring rests against an annular shoulder inside the housing and the outer edge of the annular sealing disc rests between the shoulder and the bearing ring.

It is advisable to have a screw project into the supporting layer consisting of flowable or plastic material, said screw being adapted to be screwed in from outside the joint housing. The screw may serve to adjust the pressure to be exerted by the supporting layer. Any possible leakage losses from the supporting layer can be compensated by means of the screw. The supporting layer can be poured in through the aperture in the housing provided for screwing in the screw.

An embodiment of the invention is illustrated in the drawing showing a vertical section through a ball and socket joint according to the invention.

In the embodiment, the joint housing is designated by the reference numeral 1 and the joint pin by the reference 4. The ball portion forming part of the joint pin is provided throughout with the reference numeral 5.

Between the closed side of the housing and the ball portion 5, the interior of the housing is filled with a flowable supporting layer 6. In the embodiment according to the drawing, this supporting layer consists, for example, of oil. It is essential, that the supporting layer be able to flow and fill completely the space in which it is accommodated. The supporting layer forms a bearing cushion for the ball portion which allows the joint pin to rotate and perform annular deflections. The fit between the housing and the ball portion is so chosen that the supporting layer cannot escape or flow out of the housing.

In the embodiment of the drawing, the housing 1 comprises a cap-like joint housing, a special bearing shell 7 for the ball portion being provided in this embodiment at the place where the joint pin emerges from the joint housing.

In the closed end of the housing there is provided a screw 3 which projects into the supporting layer after the fashion of a displacement means. By screwing the screw in more, it is possible to compensate fairly small leakage losses from the supporting layer. The aperture into which the screw is screwed can be used for pouring in the supporting layer.

In the embodiment illustrated the supporting layer 6 has the form of a spherical cup which extends over the equator of the ball end.

According to the embodiment of the drawing a bearing ring 9, consisting, for example, of plastic, surrounds the ball portion 5 on both sides of its equator within the joint housing. Apertures may be provided in the outer radially extending annular rib of the bearing ring which is clamped between an inner shoulder on the housing 1 and the end of the bearing shell 7 shown in the figure.

The embodiment shown in the drawing comprises a special seal 8' for the space in the housing containing the supporting layer.

In the embodiment illustrated in the drawing a cord ring is provided as the seal, said ring engaging by means of a part of its cross-section in an internal groove in the housing and having the other part of its cross-section projecting towards the ball portion and resting against it.

I claim:

1. A ball and socket joint comprising
   a pin member having a ball head at one end,
   a housing disposed about said ball head and defining a space therebetween,
   said housing having an opening at the lower end for receiving said ball head,
   ball retaining means secured to said housing at said opening and having a bore for said pin member,
   said ball retaining means having an inner bearing surface engaged by said ball adjacent said bore,
   fluid means in said space between said housing and said ball head and supporting the upper half of said ball head away from said housing,
   sealing means in said inner bearing surface and engaging said ball head for retaining said fluid means in said housing,
   and flexible bearing means fixed to said housing above said sealing means and engaging said ball member about the periphery substantially at its center line.

2. A ball and socket joint according to claim 1, wherein said sealing means is a deformable annular member partly lodged in a corresponding annular groove in said inner bearing surface.

3. A ball and socket joint according to claim 2 wherein said flexible bearing means is an annular bearing ring.

4. A ball and socket joint according to claim 3 wherein said bearing ring has an inner band-like portion engaging said ball head and a flange portion extending perpendicularly of the axis of the pin member and secured to said housing.

5. A ball and socket joint according to claim 4 wherein apertures are provided in said flange portion.

6. A ball and socket joint according to claim 4 including an inner annular recess in said housing at said lower end providing an inner shoulder, said retaining means having a substantially axially extending flange threadedly engaged in said annular recess and adapted to clamp said bearing flange portion against said inner shoulder.

7. A ball and socket joint comprising in combination,
   a pin member having a ball head at one end,
   a housing disposed about said ball head and defining a space therebetween,
   said housing having an opening at the lower end for receiving said ball head,
   an annular threaded recess around said opening providing an annular inner shoulder,
   an annular retaining nut having a radially extending portion and an axially extending flange threadedly engaged in said threaded annular recess,
   said annular nut having a bearing surface for said ball head on the inner surface of said radially extending portion,
   a sealing ring lodged in said bearing surface and engaging said ball head,
   fluid means in said space between said housing and said ball head and supporting the upper half of said ball head away from said housing,
   and a flexible bearing ring clamped between the inner end of said axially extending flange on said nut and said inner shoulder and engaging said ball member about its periphery substantially at its center line.

References Cited in the file of this patent

UNITED STATES PATENTS

| 445,775 | Garfield | Feb. 3, 1891 |
| 1,976,983 | Chandler | Oct. 16, 1934 |
| 2,421,691 | Gibson et al. | June 3, 1947 |

FOREIGN PATENTS

| 153,475 | Austria | May 25, 1938 |